Feb. 18, 1958 S. A. MONK 2,823,531
STRAIGHT-BAR KNITTING MACHINES
Filed July 2, 1956 4 Sheets-Sheet 1

S. A. Monk
Inventor by Mason, Porter, Miller & Stewart
Attorneys

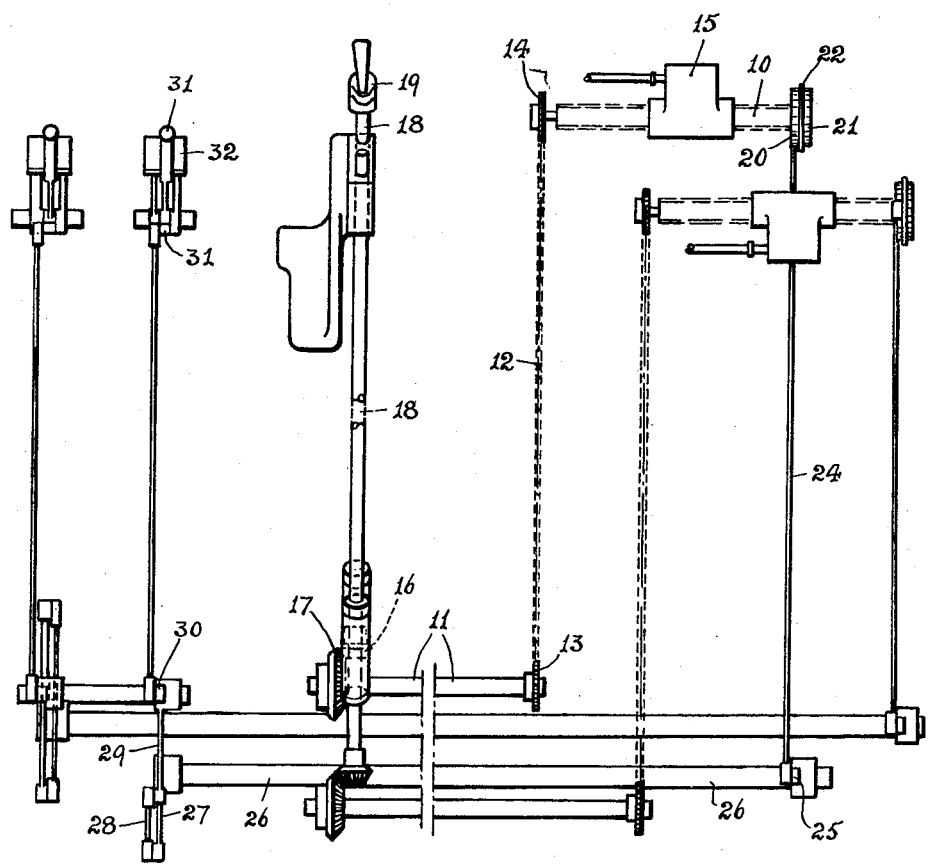

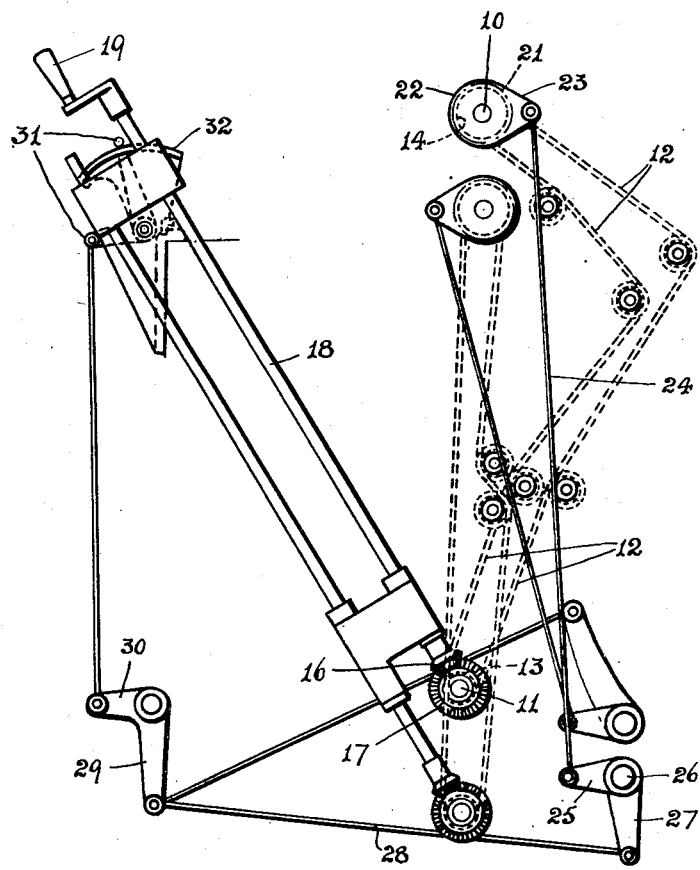

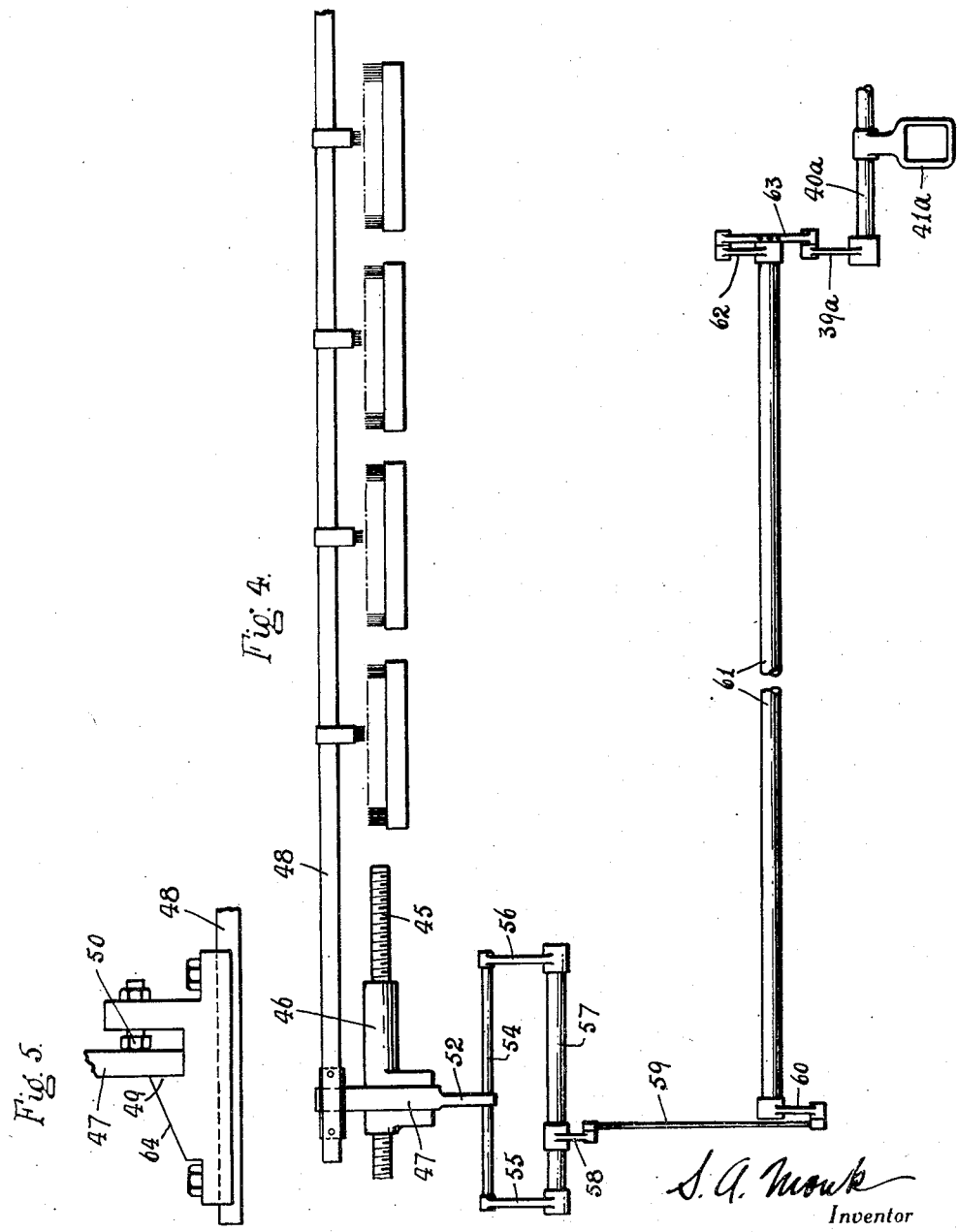

United States Patent Office 2,823,531
Patented Feb. 18, 1958

2,823,531

STRAIGHT-BAR KNITTING MACHINES

Samuel Arthur Monk, Gedling, England, assignor to S. A. Monk (Sutton in Ashfield) Limited, Sutton-in-Ashfield, England Application July 2, 1956, Serial No. 595,418

5 Claims. (Cl. 66—89)

This invention relates to improvements in straight-bar knitting machines and is particularly applicable to machines for the production of garments or parts of garments. In machines for this purpose provision is made for shaping the garments or parts thereof by both narrowing and widening the work. When a narrowing or widening operation is carried out the traverse of the thread carrier has also to be correspondingly adjusted and this is carried out by control mechanism of well known construction which moves the fashioning points transversely of the needles the required amount to make a narrowing or widening as may be required and also makes the necessary adjustment to the traverse of the thread guide. Part of the control mechanism comprises a screw and nut for each selvedge edge of the work, the nut being moved longitudinally of the screw to control the shape of the selvedge edge. The screw is rotated by ratchet and pawl mechanism as and when required to move the nut either in one direction or the other according to whether a narrowing or widening operation is being carried out. The ratchet wheel and pawl mechanism comprises two ratchet wheels and pawls, one ratchet wheel and pawl to turn the screw in one direction and the other ratchet wheel and pawl to turn the screw in the other direction. Associated with the pawls is a bluff plate which is moved to put both pawls out of action or put either one pawl or the other into action and to move its associated ratchet wheel one or two teeth according to whether the fashioning operation takes place over one or two needles. Associated with each screw is a locating plunger which engages in recesses in the periphery of a disc to accurately position the screw when turned by the ratchet and pawl mechanism. The position of the bluff plate may be altered from time to time during the production of work on the machine and as the work is usually started at a different width to that at the finish of the previous garment, the position of each screw and nut has to be re-set at the start of each garment or part thereof. The control mechanism is conveniently disposed at the end of the machine and the object of the present invention is to provide means, for adjusting the position of each bluff plate when required and for re-setting each screw, hereinafter referred to as the fashioning screw, and nut, which can be operated from a convenient point on the machine and avoid the necessity of the machine operator having to walk to the end of the machine to make the adjustments to the control mechanism as and when they are required.

According to this invention each fashioning screw and each bluff plate is connected to individual control shafts disposed longitudinally of the machine, each control shaft being turned by a connection with a handle or lever disposed at a convenient point on the machine to re-set the fashioning screws or adjust the position of the bluff plates. Each fashioning screw may be connected to its control shaft by chain and sprocket gearing and the control shaft turned by a handle on a second shaft connected to the control shaft by bevel gearing. Each bluff plate is connected by a link to an arm on its control shaft which is turned by a lever connected thereto by suitable linkage. The handles and levers are disposed at a convenient point on the front of the machine. The locating plunger associated with each fashioning screw is connected to a shaft disposed longitudinally of the machine and turned by a foot operated pedal to withdraw the plunger to an inoperative position and hold it out of action whilst the fashioning screw is turned to re-set it for the start of the next garment or part thereof.

The invention will now be more particularly described with reference to the accompanying drawings in which:

Fig. 2 is a front elevation and

Figure 1:
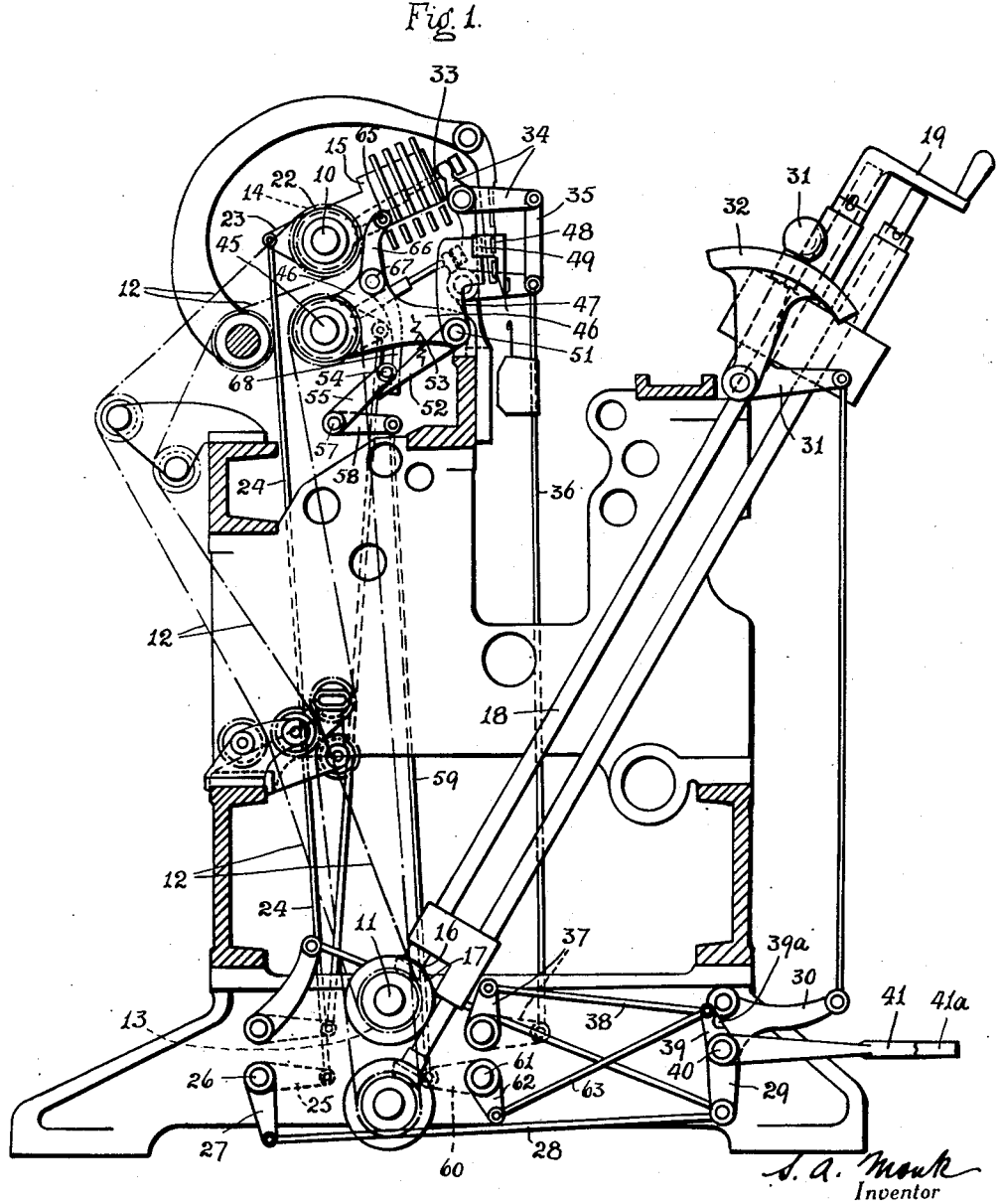
Fig. 1 is a sectional side elevation of part of a straight-bar knitting machine having fashioning screw control mechanism according to this invention.

Fig. 3 a side elevation showing the control mechanism detached from the machine and as applied to two fashioning screws.

Fig. 4 is a diagrammatic view showing the method of connecting the point bar carrying the fashioning points for shaping one side of a V neck to its fashioning screw and Fig. 5 is a plan view of the driving connection between the point bar shown in Fig. 4 and the nut on its associated fashioning screw.

Like numerals indicate like parts throughout the drawings. Only sufficient of the machine is shown in the drawings to enable the invention to be understood.

In carrying out this invention a shaft hereinafter called the fashioning screw control shaft, is provided for each fashioning screw and is mounted in bearings on the machine frame and is disposed longitudinally of the machine. The fashioning screw 10 is provided with a fashioning screw control shaft 11 which is connected to the fashioning screw 10 by chain and sprocket gearing comprising a chain 12 and sprockets 13, 14 so that by turning the fashioning screw control shaft 11 the fashioning screw 10 can be turned to re-set the nut 15 thereon in the correct position for the start of a garment or part thereof. In order to turn the fashioning screw control shaft 11 it is connected by bevel gears 16, 17 to a shaft 18 which extends to the front of the machine. The fashioning screw control shaft 11 is made a suitable length so that the second shaft 18 can be disposed at a convenient position on the machine, which position may be between two of the divisions in the machine as no extra space is required to accommodate it. The second shaft 18 has a crank handle 19 which can be engaged with the shaft 18 when it is desired to turn it. Visual indicating means such as the usual scale and pointer to indicate the position of the nut 15 on the fashioning screw 10 is disposed at a convenient point near the crank handle 19 so that the latter can be turned to the required extent to re-set the fashioning screw 10 and nut 15 in the required position at the start of a garment.

The fashioning screw 10 is turned in one direction or the other to adjust the position of the nut 15 for a narrowing or widening operation by ratchet wheel and pawl mechanism of well known construction and method of operation. This ratchet wheel and pawl mechanism includes two ratchet wheels 20, 21 (see Fig. 2) with a bluff plate 22 between them to control the pawls. The remainder of the mechanism is omitted as it is of well known construction and forms no part of this invention.

An arm 23 on the bluff plate 22 is connected by a link 24 to an arm 25 on a bluff control shaft 26 which is disposed parallel with the fashioning screw control shaft 11. An arm 27 on the bluff control shaft 26 is connected by a link 28 to one arm 29 of a bell crank lever, the other arm 30 of which is connected to a lever 31 having a quadrant 32 associated therewith. When the lever 31 is in the central position of the quadrant 32 as shown in Fig. 1, the bluff plate 22 is positioned so that both pawls are out of action. Two operative positions are provided on each side of the central or neutral position of the lever 31 so that by moving the lever in one direction the bluff plate can be set to rack the fashioning screw 10 one or two teeth in one direction whilst if the lever 31 is moved in the other direction from the neutral position the bluff plate 22 is set to rack the fashioning screw 10 in the other direction. The bluff control lever 31 may be placed in front of the crank handle 19 so that no extra space is required in the machine for the bluff control lever 31 or it may be placed at the side of the crank handle 19 as shown in the drawings.

Provision is made to withdraw the fashioning screw locating plunger 33 when the fashioning screw is re-set. To this purpose the plunger 33 is connected by suitable linkage comprising parts 34, 35, 36, 37, 38 and 39 with a shaft 40 which is turned by depressing a foot pedal 41 secured on the shaft 40. The foot pedal 41 is disposed in a convenient position for operation whilst the crank handle 19 is being turned to re-set the fashioning screw 10.

In a machine for making garments or parts thereof four fashioning screws may be provided, two located at one end of the machine and two at the other end. Two fashioning screws are provided to control the outer selvedge edges of the work and two more may be provided to control the inner selvedges during the production of a V neck. Each fashioning screw is provided with the re-setting and bluff plate control mechanism hereinbefore described and the crank handles and levers disposed at convenient points. All the locating plungers for the fashioning screws may be connected to the shaft 40 turned by depressing the foot pedal 41 or additional shafts and foot pedals may be provided.

In a straight-bar knitting machine for providing a V neck a set of fashioning points carried by a point bar is provided to shape each side of the V neck and each point bar is controlled by a fashioning screw and nut operating in well known manner. The fashioning points for the sides of the V neck operate in a central part of the needle bar and in order to avoid having to turn the fashioning screw to move them into their operative positions and back to an inoperative position when not in use, the point bars are detachably connected to the nuts on the fashioning screws so that they can be disconnected therefrom and moved manually into their inoperative position. The connection between the nuts and point bars is preferably arranged so that the point bars are automatically connected to the nuts on the fashioning screws when the point bars are moved into their working positions.

For this purpose the arrangement shown in Figs. 1, 4 and 5 is provided and shows the arrangement applied to a point bar. The arrangement is more clearly shown in Fig. 4 in which it is shown detached and more or less diagrammatically. The fashioning screw 45 has a nut 46 thereon which carries a member 47 to couple the nut 46 to the point bar 48. The member 47 engages between two abutments 49, 50 (see Fig. 5) carried by the point bar 48 to form a driving connection between the nut 46 and the point bar 48. In Figs. 1 and 4 the point bar 48 is shown connected to the nut 46 and in order that it can be disconnected from the nut 46 and moved to an inoperative position when not required the member 47 is pivoted at 51 on the nut 46 and is formed with a tail 52 moved against the action of a spring 53 to disengage the member 47 from the point bar 48. To move the tail 52 a rod 54 is provided to engage therewith. The rod 54 is carried by arms 55, 56 secured on a shaft 57 and an arm 58 on the shaft 57 is connected by a link 59 to an arm 60 on the shaft 61 which is connected by an arm 62, link 63 and arm 39a to shaft 40a (see Fig. 4) so that when the shaft 40a is turned by depressing the foot pedal 41a the member 47 is moved from its normal position and is disengaged from the point bar 48 so that the latter can be moved manually to move the points carried thereby into an inoperative position. The abutment 49 is formed with an inclined face 64 which engages with the member 47 when the point bar 48 is returned to its working position and leads the member 47 into position between the abutments 49, 50 and automatically establishes the driving connection between the nut 46 and the point bar 48.

When the point bar 48 is moved to put the points carried thereby into an inoperative position at the completion of a V neck the thread carrier for producing one side of the V neck is also moved to the side of the needle bar where it remains out of action until again required. In order to move it to its inoperative position by moving the thread carrier bar longitudinally, the thread carrier bar end stop must also be moved out of the path of the stop on the thread carrier bar. To enable this to be done the thread carried bar end stop 65 (see Fig. 1) is mounted on an arm 66 pivoted at 67 on the nut 46 and the arm 66 has a tail 68 thereon which is engaged by the rod 54 when the foot pedal 41a is depressed and the movement of the rod 54 moves the tail 68 against the action of a spring (not shown) and moves the end stop 67 out of the path of the stop on the thread carrier bar.

With the fashioning screw re-setting and bluff plate control mechanism described the crank handles and levers can be disposed at the most convenient point in the machine and no additional space is required to accommodate them so that there is no increase in the length of the machine over the normal end controlled type.

What I claim is:

1. In a straight-bar knitting machine the combination with a plurality of fashioning screws and associated bluff plates each with a separate control shaft disposed longitudinally of the machine, means to connect each control shaft to its associated bluff plate and means to turn each control shaft to adjust the position of the bluff plates and to reset the fashioning screws.

2. In a straight-bar knitting machine the combination of a fashioning screw, a nut thereon, a bluff plate to control the fashioning screw racking mechanism, a control shaft disposed longitudinally of the machine, a chain connecting the control shaft to the fashioning screw, a crank handle on a shaft connected by bevel gearing to the control shaft to turn the latter to re-set the fashioning screw, a second control shaft disposed longitudinally of the machine, a link connecting the bluff plate to an arm on the second control shaft and a lever connected by a link to a second arm on said second control shaft to turn the latter to adjust the position of the bluff plate.

3. A straight-bar knitting machine according to claim 2 in which the crank handle and lever are disposed at a convenient point on the front of the machine.

4. In a straight-bar knitting machine according to claim 2 the combination with the nut of a point bar, abutments on the point bar, a pivoted member on the nut to engage between the abutments to connect the point bar to the nut, a tail on the pivoted member, a rod to engage the tail, arms on a shaft to carry the rod, and a connection between the shaft and a foot pedal operated to turn the shaft and move the pivoted member from its position between the abutments.

5. In a straight-bar knitting machine according to claim 4 the combination with the nut of a point bar, releasable means to connect the point bar to the nut, a thread carrier bar, an end stop therefor, an arm pivoted on the nut to carry the end stop, an abutment on the thread carrier bar, a tail on the pivoted arm, a rod to engage with the tail, arms secured on a shaft to carry the rod and a connection between the shaft and a foot pedal operated to turn the shaft and move the end stop out of the path of the abutment on the thread carrier bar.

References Cited in the file of this patent

FOREIGN PATENTS

| | | |
|---|---|---|
| 645,188 | Germany | May 24, 1937 |
| 645,502 | Germany | May 29, 1937 |
| 748,370 | Great Britain | May 2, 1956 |